C. W. CRAMER.
ANTISKIDDING DEVICE FOR VEHICLE TIRES.
APPLICATION FILED MAY 11, 1911.
1,072,579.
Patented Sept. 9, 1913.
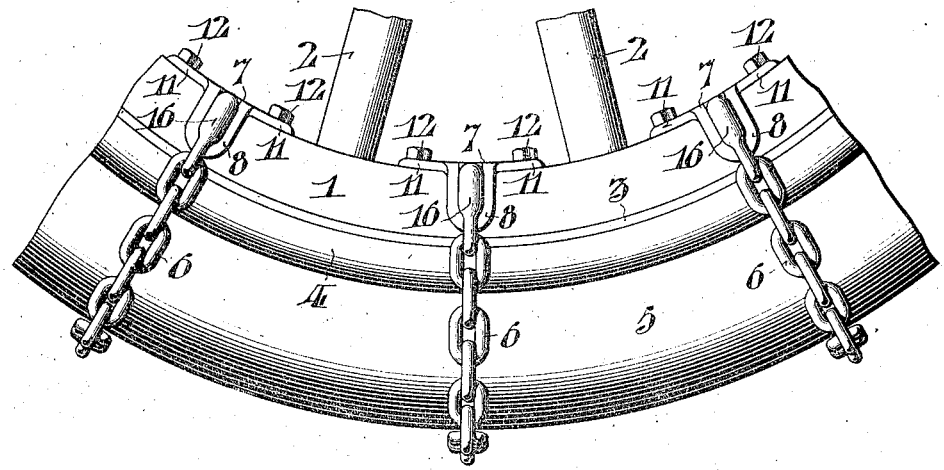
FIG. I.
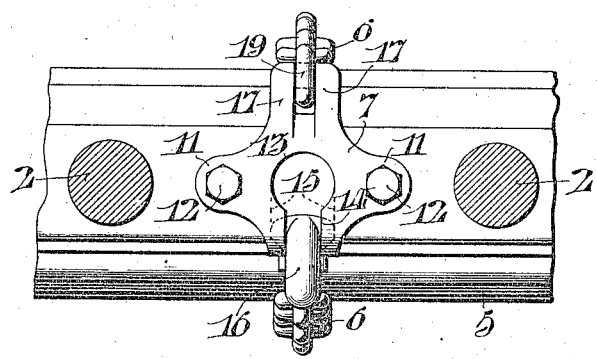
FIG. II.
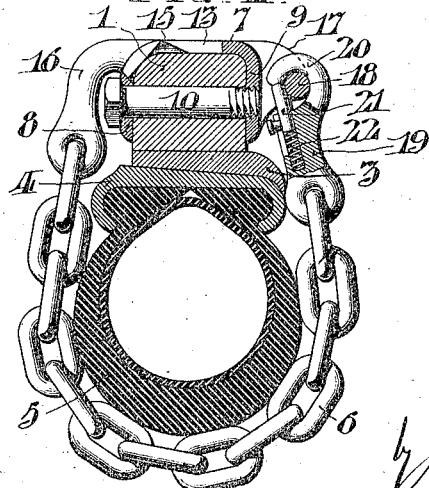
FIG. III.
Inventor
Charles W. Cramer,
Witnesses

UNITED STATES PATENT OFFICE.

CHARLES W. CRAMER, OF SCRANTON, PENNSYLVANIA.

ANTISKIDDING DEVICE FOR VEHICLE-TIRES.

1,072,579.　　　　　Specification of Letters Patent.　　Patented Sept. 9, 1913.

Application filed May 11, 1911. Serial No. 626,426.

*To all whom it may concern:*

Be it known that I, CHARLES W. CRAMER, of Scranton, in the county of Lackawanna and State of Pennsylvania, have invented certain new and useful Improvements in Antiskidding Devices for Vehicle-Tires, whereof the following is a specification, reference being had to the accompanying drawings.

The invention relates to anti-skidding devices of the character wherein a chain is attached to the felly and extends about the tire so as to lie between the contacting surface of the tire and the road bed.

An object of the invention is to provide means for attaching the chain to the felly of the wheel, so that the chain may be readily detached when desired, and so that when said chain is attached to the wheel, it will extend closely about the tire.

In the drawings which show by way of illustration one embodiment of the invention, Figure I, is a view in side elevation showing a part of a vehicle wheel having my improvements applied thereto. Fig. II, is a plan view of one of the attaching brackets and the parts of the wheel to which it is directly connected. Fig. III, is a sectional view through the outer part of the vehicle wheel, showing the attaching bracket in end view and the chain connected therewith.

The vehicle wheel as herein shown, consists of a felly 1, to which is attached spokes 2, in the well known manner. The felly 1, carries a fixed rim 3, to which is connected a detachable rim 4, which supports a tire proper 5.

While I have shown my improved antiskidding device as applied to a tire construction, as above noted, it will be obvious that from certain aspects of the invention, said anti-skidding device may be applied to other constructions of wheels, and the one herein illustrated and described is solely for the purpose of explaining the invention.

My improved anti-skidding device consists of a plurality of chains 6, which are spaced about the wheel and are preferably located between the spokes thereof. The chain 6, is detachably connected to a bracket 7. Said bracket 7, is formed with side members 8, and 9, and when the bracket is placed on the felly of the wheel, said bracket extends across the felly, and the side members 8, and 9, engage the side faces of the felly. The bracket is secured to the felly by a bolt 10, extending through the side members 8, and 9, and through the felly 1. The central part of the bracket is formed with projecting lugs 11, which are also secured to the felly proper by bolts or screws 12. Centrally of the upper portion of the bracket is a recess 13, which extends through the bracket. Leading from the recess 13, is a slot 14, which is undercut, as at 15. This slot 14, extends to the side member 8, of the bracket, and down the side member 8, for a short distance. The chain 6, carries at one end a securing hook 16, which is formed with an enlarged head having a tapered shoulder. This head is so shaped that when the hook 16, is held in horizontal position, the head may be inserted in the recess 13, in the bracket 7. After the head is inserted in the recess 13, it is moved along the slot 14, and the tapered head fits the undercut portion of the slot.

The hook 16, is turned from a horizontal position to a vertical position, and the tapered head carried down the slot 14, in the side member 8, until said tapered head seats against the bottom of the slot. This construction serves as a means for detachably connecting the member 16, with the bracket 7. The bracket 7, at the other side thereof is formed with projecting lugs 17, which are connected by the securing cross bar 18, which is adapted to receive a hook 19, carried by the other end of the chain 6. The free end 20, of the hook 19, extends substantially at right angles to the body of the hook, so that when the chain is brought about the tire, said projecting portion 20, of the hook may be readily placed over the securing bar 18, and the chain held substantially tight about the tire. A sliding keeper 21, is mounted in a socket in the hook 19, and the spring 22, normally forces the keeper against the outer free end 20, of the hook, and locks the hook on the securing bar 18. By this construction of hook and sliding keeper, the chain may be brought fairly tight about the tire and attached to the securing bar. This prevents the use of a great deal of slack chain, which during the speeding of the vehicle, is thrown out against the guards for the wheels. The chain through the headed hook on one side is positively connected to the bracket, and through the hook having the sliding keeper on the other side, is also positively connected with the bracket, and the chain is thereby securely attached to the felly of the wheel.

If desired the chain may be made in suitable lengths so that one end thereof may be connected to one bracket, and the other end connected to the next adjacent bracket, and the chain extend in a zig zag direction across the vehicle tire. It will be noted that the chains may be readily attached or detached from the vehicle wheel.

While I have shown the bracket as formed with projecting lugs and a cross bar for connecting the same, it is obvious that this securing bar for the hook of the chain may be formed in other ways.

It is obvious that minor changes in the details of construction may be made without departing from the spirit of my invention as set forth in the appended claims.

I claim:—

1. An anti-skidding device for tires, comprising a bracket, means for securing the bracket to the felly of the wheel, a securing bar attached to the bracket, a chain, a securing member attached to the chain having a head formed thereon, said bracket having a recess formed therein, a slot leading from the recess for engaging the head on the chain, a hook carried by the other end of said chain adapted to engage said securing bar, said hook having its free end extending in a direction substantially at right angles to the body thereof, and a sliding keeper for locking the hook on the bar.

2. An anti-skidding device for tires, comprising a bracket; means for securing the bracket to the felly of the wheel; said bracket having a recess formed therein, and a slot leading from said recess and having an under-cut wall; a chain; a hook carried at one end of the chain, and having an enlarged tapered head, adapted to engage said recess, and to be moved into locking engagement with the under-cut wall of said slot; a securing bar carried by the bracket; and a hook carried by the other end of the chain and adapted to engage said securing bar.

3. An anti-skidding device for tires comprising a bracket; means for securing the bracket to the felly of the wheel, said bracket having a recess formed therein, and a slot leading from said recess, the walls of said slot being undercut; a chain; a hook carried by one end of said chain and having a head with a tapered shoulder adapted to be inserted in said recess and be moved into locking engagement with the undercut walls of the slot; a securing bar carried at the other side of said bracket; and a hook carried by the other end of said chain and adapted to engage said securing bar.

In testimony whereof, I have hereunto signed my name at Scranton, Pa., this 8th day of May, 1911.

CHARLES W. CRAMER.

Witnesses:
HUGH D. ANDREWS,
ALMA M. LOVERING.